Patented Nov. 8, 1927.

1,648,596

UNITED STATES PATENT OFFICE.

WILLIAM K. SCHWEITZER, OF CLEVELAND, OHIO, ASSIGNOR TO THE GRASSELLI CHEMICAL COMPANY, OF CLEVELAND, OHIO, A CORPORATION OF OHIO.

INSECTICIDE.

No Drawing. Application filed September 29, 1924. Serial No. 740,636.

The present invention relates to the preparation of insecticides consisting of or comprising an arsenate or arsenates of manganese having a brown color and a low water soluble arsenic content.

In an application Serial Number 740,626, filed September 29, 1924, in the name of Harry P. Corson, there is described a method for the preparation of brown colored products consisting of or containing an arsenate or arsenates of manganese which involves the treatment of a manganese arsenate or a mixture of manganese arsenates or a material containing the same such as the reaction product of manganese dioxid and arsenious oxid prepared, for instance, in accordance with the process described in application Serial Number 654,781, filed July 30, 1923, in the name of Wellington Lee Tanner, with an alkaline agent such as lime for the purpose of developing the desired brown color. In another application Serial Number 740,634, filed simultaneously herewith I have described a method for the preparation of products of low water-soluble-arsenic content suitable for use as insecticides which consists generally in treating dimanganoarsenate or a material containing it, such as the reaction product of manganese dioxid and arsenious oxid, with an agent such as the carbonates of manganese, calcium and magnesium, capable of converting dimanganoarsenate to trimanganoarsenate and of forming an insoluble arsenate.

My present invention involves a combination of said prior processes and includes three main steps as follows:

(1) The preparation of dimanganoarsenate;

(2) The treatment of the dimanganoarsenate with a material for reducing its water-soluble arsenic content;

(3) The treatment of the product of (2) with an alkaline agent for the purpose of converting it to a brown colored material.

Steps (2) and (3) are applicable successively to dimanganoarsenate or a material containing it, regardless of how it is prepared, but for commercial manufacture I prefer to treat the reaction product of manganese dioxid and arsenious oxid prepared in accordance with the process described in the Tanner application above referred to. A preferred way of carrying out such process is as follows:

Pyrolusite or a similar oxidized manganese ore and arsenious oxid, for instance in the form of commercial white arsenic preferably in combining proportions in accordance with the reaction equation

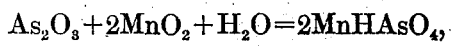
$$As_2O_3 + 2MnO_2 + H_2O = 2MnHAsO_4,$$

are suspended in water in quantity just sufficient to give a slurry that can be readily agitated throughout the course of the reaction, say from 10 to 15 times the weight of the pyrolusite, with a catalyst such as nitric acid preferably in quantity amounting to about 3% of the combined weights of the pyrolusite and white arsenic, and the mixture is heated to about its boiling temperature until the reaction has proceeded to the desired point. For the purposes of the present invention the reaction need not be continued to completion but may be continued until it is only about 90%–95% complete, the time required under the conditions specified being in the neighborhood of 5 hours.

The pyrolusite or equivalent and white arsenic should be used in combining proportions as stated, in order to avoid the presence in the reaction product of unreacted pyrolusite which appears in the form of black gritty particles or an excessive water-soluble arsenic content which is difficult to remove. The quantity of water used in the preparation of the slurry is quite important. If too little water is used the reaction mixture stiffens as the reaction proceeds and it may become difficult or even impossible to properly stir it, whereas if too much water is used the reaction is retarded. Water may of course be added to the reaction mixture during the reaction to replace that evaporated or to thin the slurry in case it becomes too stiff. The quantity of catalyst may be varied or it may be omitted entirely and the reaction carried to completion without it, but the reaction rate is much slower. A variety of catalytic agents generally of an acid nature other than nitric acid such as nitrobenzene, picric acid, acetic acid, hydrofluoric acid, etc., may be employed. The reaction proceeds more rapidly at elevated temperatures and heating to boiling temperature in an open vessel therefore is preferred, although lower or higher temperatures may be employed. The reaction is carried out preferably in glass, porcelain or the like, since certain metals, particularly iron, have been found to retard the reaction.

The reaction product consists principally of dimanganoarsenate and may contain some trimanganoarsenate, unreacted manganese dioxid and arsenic, in case the reaction has not reached completion, and impurities.

The second step of the process as stated consists in treating dimanganoarsenate or a material containing it with a material such as manganese carbonate for reducing its water soluble arsenic content. In commercial practice this step preferably is applied to the reaction product of the first step and will be described and illustrated in this connection. The treatment may be applied either to the separated solid reaction products of the first step by slurrying them in water and adding the manganese carbonate or other agent capable of reducing the water-soluble-arsenic content thereto or by adding the manganese carbonate or the like directly to the reaction mixture of the first step without separating the solid reaction products from the liquid, the latter being the preferred procedure. The resulting slurry is then heated preferably to about the boiling temperature with agitation until the reaction has proceeded to the desired extent. In this step both the quantity of manganese carbonate added and the time of heating are variable. I have found that a quantity of manganese carbonate (rhodochrosite) amounting to about 10% of the weight of the dry charge of the first step produces the maximum water-soluble-arsenic reducing action. As the quantity of manganese carbonate is varied from 5% to 10% very little change in the water soluble arsenic content of the product results and therefore a quantity of manganese carbonate amounting to about 5% of the dry charge of the first step is preferred. The water-soluble-arsenic reducing action of the manganese carbonate is practically complete after about 18 hours treatment, a slight further reduction taking place by treatment up to 24 hours. A period of 18 hours therefore is a preferred treating time. In case the reaction product of the first step has been separated from the liquid and dried prior to the manganese carbonate treatment, the use of in the neighborhood of 10% of manganese carbonate is preferred. By this treatment the water-soluble-arsenic content of the product of the first step which, when produced in accordance with the preferred procedure described, runs in the neighborhood of 2.5% to 3% $As_2O_5$ is reduced to in the neighborhood of 1% to 1.5%. The reaction involved in the second step just described is as follows:

$$2MnHAsO_4 + MnCO_3 = Mn_3(AsO_4)_2 + CO_2 + H_2O.$$

The quantity of water present and the material of the reaction vessel employed in the second step are not important. The quantity of water need be only sufficient to permit agitation and the reaction vessel, so far as I have found, may be of any suitable material such as glass, lead, iron, etc.

In place of manganese carbonate, calcium carbonate or magnesium carbonate or mixtures thereof or in general any compound capable of converting dimanganoarsenate to the trimanganoarsenate and of forming an insoluble arsenate and not sufficiently alkaline to decompose manganese arsenate and liberate manganese hydroxide, may be employed. Calcium and magnesium carbonates may be substituted for manganese carbonate in the procedure described with substantially equivalent results.

The third step of the process of my present invention consists in treating the reaction product of the second step, said product containing dimanganoarsenate and trimanganoarsenate, with an alkaline agent for the purpose of developing a brown color. For this purpose any material sufficiently alkaline to liberate manganese hydroxid from the arsenate may be used, such as for instance the alkali and alkaline earth metal hydroxids, but the interaction of the alkali metal hydroxids with manganese arsenates forms soluble arsenates which are difficult to remove from the solid reaction products, for instance by washing, or if left in it result in a water-soluble arsenic content and thus render the product less suitable for use as an insecticide. For practical reasons therefore the invention is limited to the use of alkaline agents capable of forming insoluble arsenates, lime or calcined dolomite being preferred.

The step is carried out by adding lime or a slurry of slaked lime in water to the reaction mixture of the manganese carbonate treatment or to the separated solid reaction products thereof slurried in water and digesting the resulting mixture preferably with heating to about the boiling temperature with agitation in an open vessel. The quantity of lime and the time of treatment for this step depend upon the depth of color desired. A maximum effect is obtained with any given amount of lime in about 24 hours treatment and the maximum coloring effect is obtained with a quantity of lime amounting to about 10% of the combined weights of the pyrolusite and white arsenic used in the first step of the process. Treatment with 10% of lime for 24 hours gives a product of a dark brown color resembling cocoa. By using lime in quantities amounting to from 2% to 10% of the original dry charge, products of varying shades of brown can be prepared.

In determining the quantity of manganese carbonate to be used in the second step and the quantity of lime to be used in the third step, the total arsenic content of the final product should be taken into consideration. In general I have found that in order to obtain a final product containing 40% of total arsenic oxid using pyrolusite and white arsenic as the starting materials, the combined weights of the manganese carbonate and lime used should not exceed 15% of the combined weights of the pyrolusite and white arsenic. This limitation permits the use of about 5% manganese carbonate which will give substantially the maximum reduction in the water-soluble arsenic content of the pyrolusite-white arsenic reaction product and 10% of lime which will give substantially the maximum coloring effect.

The following specific example illustrates a preferred procedure in accordance with my invention.

100 pounds of pyrolusite containing 67% MnO and 14.3% available oxygen, 90 pounds of white arsenic, 5.5 pounds of concentrated nitric acid and 1500 pounds of boiling water are mixed in a lead lined tank which should be about three-fourths full. The mixture is heated to about boiling temperature and thoroughly agitated for about 12 hours after which 9.5 pounds of rhodochrosite are added and the heating and agitation continued for 18 hours. Then add 19 pounds of lime and continue the heating and agitation for 24 hours. During the first stage of the process the volume of water in the mixture is maintained constant by the addition of water, but thereafter during the second and third stages about one-half of the water may be permitted to evaporate. After the treatment with lime the mixture is filtered and the solid product washed, dried and ground to a powder. The product so prepared has a total arsenic content of 40% $As_2O_5$ or more and a soluble arsenic content of only slightly more than 1% $As_2O_5$.

The second and third steps of the process may be combined in a single operation. For this purpose the heating and agitation in the first step are continued for 24 hours and the lime and manganese carbonate then added simultaneously and the agitation and heating continued for 24 hours. More time is allowed for the completion of the reaction of the first step when the second and third steps are combined, because after the addition of lime the reaction between the pyrolusite and white arsenic, which is not complete in 12 hours or even entirely complete in 24 hours, proceeds very slowly and therefore should be nearly complete before the lime is added. Alkalies in general retard the arsenate-forming reaction.

When the second and third steps are combined as described, the water-soluble-arsenic reducing agent and the color developing agent, i. e., lime and calcium carbonate, may be supplied in the form of partially burned lime.

In case it is necessary to stop the process after either of the first two steps the solid product may be separated and dried and the process continued at a future time by simply slurrying the dried product in water.

I have found in lieu of using fresh water and a catalytic agent in making the original slurry of white arsenic and pyrolusite, that the liquors obtained from filtering off the reaction product either after the pyrolusite-white arsenic reaction, or after the carbonate treatment, provided there has been no separation of the product before the carbonate treatment, or after the lime treatment provided there has been no separation of the product from the original suspension medium, or after the simultaneous treatment with lime and a carbonate provided there has been no separation of the product from the original suspension medium, may be used in making a fresh suspension of pyrolusite and white arsenic without the addition of fresh catalysts and with but very little decrease in the speed of the pyrolusite-white arsenic reaction. It must be noted that the liquors after the pyrolusite-white arsenic reaction may still contain nitric acid, but after the carbonate treatment there will no longer be free nitric acid present but rather nitrates which serve as the catalytic agent.

I claim:—

1. Process which comprises digesting a mixture of a material containing dimanganoarsenate with a substantially non-alkaline compound capable of reacting with the dimanganoarsenate to form an insoluble arsenate in the presence of water, and digesting the resulting solid material with an alkaline agent capable of forming manganese hydroxid from manganese arsenates in the presence of water.

2. Process which comprises heating and agitating a mixture comprising manganese dioxid and arsenious oxid in water in the presence of a catalyst until reaction is substantially complete, and adding manganese carbonate and lime to the mixture during the continuation of the agitation and heating thereof.

3. Process which comprises heating and agitating about 100 parts by weight of a mixture of pyrolusite and white arsenic in combining proportions to form dimanganoarsenate with water in quantity amounting to from 10 to 15 times the weight of the pyrolusite and about 3 parts by weight of nitric acid until the interaction of the pyrolusite and white arsenic is at least 90% complete, adding about 5 parts by weight of manganese carbonate to the mixture and continuing the heating and agitation, and adding about 10 parts by weight of lime to the mixture and continuing the heating and agitation.

4. Process which comprises mixing a solid material containing dimanganoarsenate with from 5 to 10 percent of its weight of a carbonate of a metal capable of forming an insoluble arsenate and water sufficient to form a slurry, heating and agitating the slurry, adding an alkaline compound of a metal capable of forming an insoluble arsenate in quantity amounting to from 2% to 10% of the weight of the dimanganoarsenate-containing material to the slurry, and heating and agitating the resulting slurry.

5. Process which comprises mixing a solid material containing dimanganoarsenate with from 5 to 10 percent of its weight of manganese carbonate and water sufficient to form a slurry, heating and agitating the slurry, adding lime in quantity amounting to from 2% to 10% of the weight of the dimanganoarsenate-containing material to the slurry, and further heating and agitating the slurry.

6. Process which comprises digesting dimanganoarsenate with manganese carbonate and lime in the presence of water.

7. Process which comprises digesting the reaction product of manganese dioxid and arsenious oxid with a carbonate of a metal capable of forming an insoluble arsenate and an alkaline compound of a metal capable of forming an insoluble arsenate in the presence of water.

8. An insecticide having a permanent brown color and comprising a manganese arsenate, a carbonate of a metal capable of forming an insoluble arsenate, hydrated manganese oxide and calcium arsenate.

9. An insecticide having a permanent brown color and comprising a manganese arsenate, a carbonate of a metal capable of forming an insoluble arsenate, hydrated manganese oxide and calcium arsenate, being substantially identical with the reaction product obtained by agitating a mixture comprising manganese dioxide and arsenious oxide in water in presence of a catalyst until reaction is substantially complete and adding manganese carbonate and lime to the mixture during the continuation of the agitation and heating thereof.

In testimony whereof, I affix my signature.

WILLIAM K. SCHWEITZER.